(12) United States Patent
Svanholm et al.

(10) Patent No.: US 7,930,835 B2
(45) Date of Patent: Apr. 26, 2011

(54) AIMING OF A GEODETIC INSTRUMENT

(75) Inventors: Set Svanholm, Sollentuna (SE);
Christian Grässer, Vallentuna (SE);
Michael Vogel, Schleifreisen (DE); Nick Mein, NZ-Christchurch (NZ)

(73) Assignee: Trimble AB, Danderyd (SE)

( * ) Notice: Subject to any disclaimer, the term of this patent is extended or adjusted under 35 U.S.C. 154(b) by 0 days.

(21) Appl. No.: 12/448,547

(22) PCT Filed: Jan. 25, 2007

(86) PCT No.: PCT/EP2007/000629
§ 371 (c)(1),
(2), (4) Date: Nov. 9, 2009

(87) PCT Pub. No.: WO2008/089789
PCT Pub. Date: Jul. 31, 2008

(65) Prior Publication Data
US 2010/0088910 A1    Apr. 15, 2010

(51) Int. Cl.
*G01C 1/04* (2006.01)
*G01C 15/00* (2006.01)

(52) U.S. Cl. ........................................ 33/290
(58) Field of Classification Search .................. 33/290
See application file for complete search history.

(56) References Cited

U.S. PATENT DOCUMENTS

| | | | |
|---|---|---|---|
| 6,559,931 B2* | 5/2003 | Kawamura et al. | 356/4.01 |
| 7,623,224 B2* | 11/2009 | Vogel | 356/141.5 |
| 7,726,033 B2* | 6/2010 | Ohtomo et al. | 33/275 R |
| 2003/0048438 A1 | 3/2003 | Kawamura et al. | |
| 2006/0021236 A1* | 2/2006 | Endo | 33/290 |
| 2010/0037474 A1* | 2/2010 | Hertzman et al. | 33/290 |
| 2010/0141775 A1* | 6/2010 | Vogel | 348/187 |
| 2010/0259610 A1* | 10/2010 | Petersen | 348/142 |

FOREIGN PATENT DOCUMENTS

| | | |
|---|---|---|
| EP | 1 607 718 | 12/2005 |
| WO | WO 99/60335 | 11/1999 |

OTHER PUBLICATIONS

Chinese Office Action dated Jul. 12, 2010.

* cited by examiner

*Primary Examiner* — Christopher W Fulton
(74) *Attorney, Agent, or Firm* — Harness, Dickey & Pierce, P.L.C.

(57) ABSTRACT

A method for aiming a surveying instrument towards a selected target is disclosed. The method includes, in at least one embodiment, capturing an image using a camera in the surveying instrument; selecting a target by identifying an object point in the image captured by the surveying instrument; calculating first horizontal and vertical rotation angles based on the object point identified in the image; rotating the surveying instrument over the first horizontal and vertical rotation angles to an intermediate line of sight; measuring a distance to a point along the intermediate line of sight; and calculating second horizontal and vertical rotation angles based on the object point in the image and on the measured distance. In at least one embodiment, the method may be implemented using computer software, hardware, firmware or a combination thereof. There is also disclosed a surveying instrument in which at least one embodiment of the method is implemented.

20 Claims, 6 Drawing Sheets

AIMING OF A GEODETIC INSTRUMENT

TECHNICAL FIELD

The present invention relates to aiming of surveying instruments, such as total stations. More particularly, the present invention relates to aiming of survey instruments having a camera for capturing a field of view and a distance meter for measuring distance to an identified target point within the field of view.

BACKGROUND

In surveying, the use of a camera in a geodetic instrument may provide for improved user convenience and new functions. Particularly, a view such as an image or a video feed provided by the camera and shown on a display of the instrument may be used for assisting target selection and for providing the user with an overview of potential points of interest.

One apparent difference between a traditional eyepiece and a video image shown on a display, is that the display image may have an active overlay of information. Various information may be given together with the captured image to facilitate instrument usage.

For a general background of total stations comprising a camera for capturing an image or a video feed of the view towards which the total station is aimed, reference is made to WO 2005/059473.

Surveying instruments of this kind, i.e. which includes a camera, are sometimes referred to as video-theodolites.

SUMMARY

In the field of video-theodolites, or more generally for geodetic instruments provided with a camera, problems arise when the camera center and the instrument center are not the same. Rotation angles determined based on the camera image will normally not apply directly as appropriate rotation angles for the instrument.

The present invention provides a method for aiming an electronic distance measurement beam (EDM beam) to a point of interest, or target, identified in an image captured by a camera in a surveying instrument.

In particular, the present invention addresses a situation in which a line of sight for an EDM beam and a line of sight for a camera are non-coaxial (eccentric).

When the line of sight for a camera and the optical axis for distance measurement (line of sight for EDM beam) in a surveying instrument are non-coaxial (eccentric), it is generally not possible to determine correct horizontal and vertical rotation angles for turning the optical axis towards an arbitrary point identified or indicated in an image captured by the camera. In other words, if rotation angles are determined from an image captured by the camera and the instrument is rotated about a rotation center that is not coinciding with the camera center, then the rotation angles will typically not be adequate. Only if the distance to the point of interest is known will it be possible to derive the correct rotation angles from the image.

The present invention provides a method for aiming a surveying instrument to a target, wherein the target is selected by clicking, or otherwise indicating, a point of interest in an image captured by the camera, and wherein the sight line of the instrument is automatically aimed towards the selected point of interest.

The present invention is based upon an understanding that a coarse measurement of distance to the point of interest can be used for aiming the sight line of the surveying instrument (i.e. to calculate appropriate rotation angles), and once the instrument has been correctly aimed towards the point of interest an accurate measurement of the distance to this point of interest can be made.

In brief, a method according to the invention may comprise the following steps:

An operator selects a target (point of interest) within an image or video feed captured by the camera of the surveying instrument. As will be understood, other options for identifying the target may also be provided.

First horizontal and vertical rotation angles are determined based on the captured image and any initial value for the target distance, taking for example the distance to be equal to the last measured value or equal to infinity.

The line of sight of the instrument is rotated by the first horizontal and vertical angles. This will not aim the instrument exactly at the selected target, but will constitute an inexact aiming of the target due to the eccentricity of the camera with respect to the instrument line of sight for the EDM beam.

A coarse distance to the selected target is measured by the EDM beam. This coarse distance to the selected target is obtained by measuring the distance to a point close to, but generally not exactly coinciding with, the selected target, i.e. to the point at which the instrument is aimed after the first rotation.

Using the coarse distance measured, new angles are calculated, this time based on the coarse distance measured. These new angles that are calculated will correspond closely to the rotation required to position the instrument line of sight exactly towards the selected target. A final rotation of the instrument is effected using these angles.

Once the instrument has been correctly aimed with the line of sight towards the selected target, a fine distance measurement is performed, and the coordinates for the selected target are stored in a memory.

The present invention also provides a total station which comprises various means for carrying out the above-described method.

In addition, the present invention can be implemented in a computer program that, when executed, performs the inventive method in a surveying instrument. The computer program may, for example, be downloaded into a surveying instrument as an upgrade. As will be understood, the inventive method can be implemented for a surveying instrument using software, hardware or firmware, or a combination thereof, as desired in view of the particular circumstances.

BRIEF DESCRIPTION OF THE DRAWINGS

In the following detailed description, reference is made to the accompanying drawings, on which.

DETAILED DESCRIPTION

Figure 1:
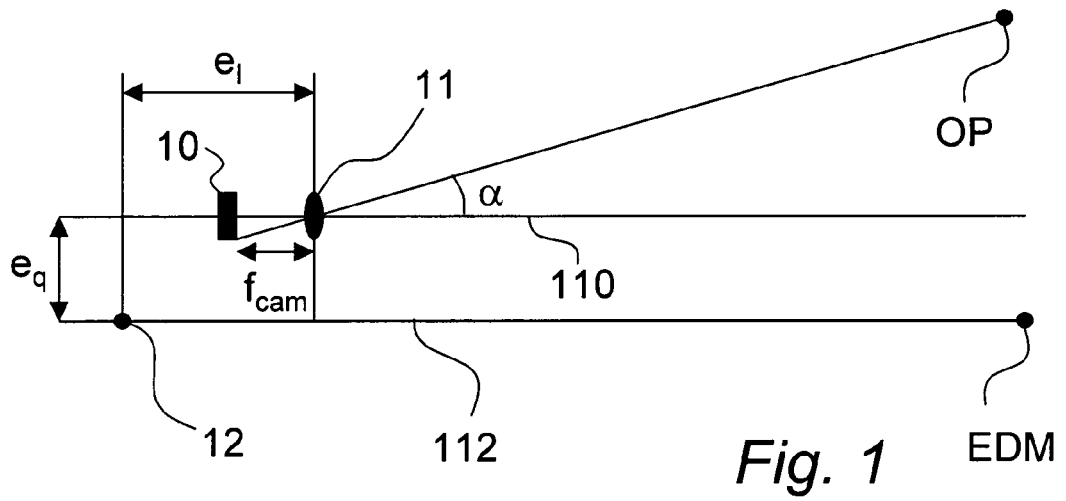
FIG. 1 is a schematic diagram showing, from the side, a situation for a surveying instrument having a camera that is eccentric to the instrument rotation center.

FIG. 1 illustrates schematically a situation where an object point OP is identified in an image captured by a camera in a surveying instrument. In the figure, there is shown a camera sensor 10, such as a CMOS camera or a CCD, for capturing an image centered about a camera axis 110. An image is formed on the camera sensor 10 by means of an optical system 11. The surveying instrument can be aimed at a desired target by rotation over horizontal and vertical angles about a rotation center 12 of the instrument. As illustrated in the figure, the optical system 11 for the camera is eccentric with respect to the rotation center of the instrument (separation $e_q$ and $e_f$, respectively, from the rotation center of the instrument). The camera axis 110 (center line for the camera view) is thus not collinear with the optical axis 112 of the instrument (the EDM line of sight), as illustrated in the figure.

Figure 3:
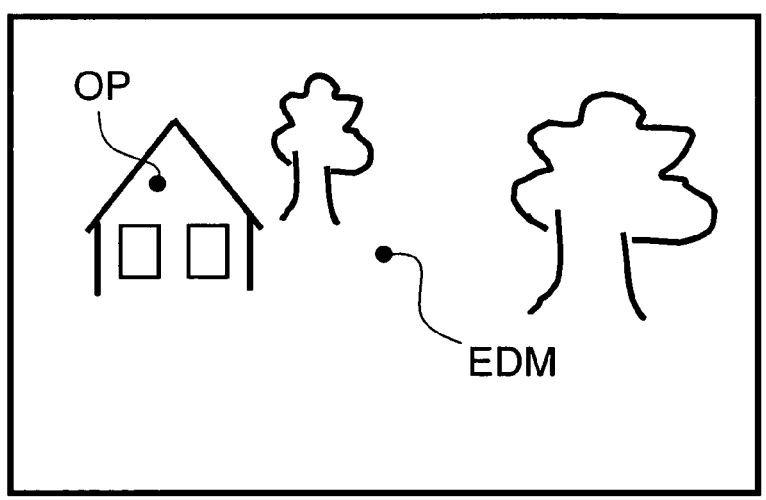
FIG. 3 schematically shows an image or video frame that may be captured by the camera and presented on a screen of the instrument.

FIG. 3 schematically shows an image captured by the camera. Such image may be presented to an operator using the surveying instrument, such that the operator may select a target or an object point OP by clicking in the image or otherwise indicating the desired object point. The optical axis (i.e. the EDM line of sight) of the instrument is directed roughly towards the image center, which is shown at reference EDM in FIG. 3.

For aiming the surveying instrument towards a selected target (object point OP), there are a number of functions implemented in the instrument. Rotation of the instrument is invoked by a rotation function that takes horizontal and vertical rotation angles as inputs, i.e. the function can be described as Rotate $(\alpha^x, \alpha^y)$ where $\alpha^x$, $\alpha^y$ are the desired horizontal and vertical rotation angles, respectively. When the rotation function is invoked, the instrument is rotated relative to its current rotational position.

In order to find the desired rotation angles, there is also implemented a function in the instrument (or in an associated control unit) that calculates the rotation angles based on pixel difference in the image or video feed captured by the camera. In order to find the rotation angles using this function, it will also be required to know the distance to the target. Hence, the function that calculates the instrument rotation angles based on image pixels can be described as $$(\alpha^x, \alpha^y) = \text{PixToAngle}(\Delta x, \Delta y, d, C)$$

where $\Delta x$, $\Delta y$ are the number of pixels (or more generally, pixel coordinates) between the current target and the desired target in the horizontal and vertical direction, respectively, d is the distance to the target, and C are possible calibration factors to be determined for each system. The calibration factors C may include details about the camera, such as but not limited to its eccentricity $e_q$ and $e_f$ and its focal length $f_{cam}$ (cf. FIG. 1). For a general description of how to calculate rotation angles based on an image captured by a camera in the instrument, reference is made to the above-mentioned WO 2005/059473.

Figure 2:
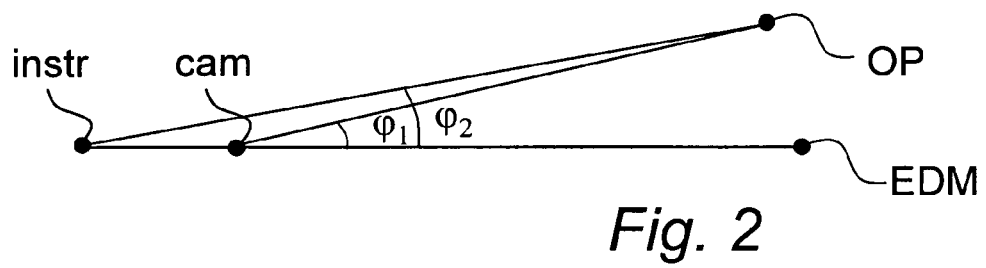
FIG. 2 schematically shows, from above, how the eccentricity between the camera and the instrument center leads to angle differences relative to an object point also in a situation where the instrument sight line and the camera field of view are coaxial.

In order to understand the requirement of knowing the target distance, it may be useful to study the schematic diagram shown in FIG. 2. FIG. 2 is a plan view taken from above, and illustrates the angles between the current line of sight (EDM) and the desired target point (OP) for both the camera (cam) and the instrument (instr) center. The camera may be used for determining the camera angle $\phi_1$ to the object point OP, but the instrument rotation required in order to aim at this object point OP will be a slightly different angle $\phi_2$ as indicated in FIG. 2. Hence, in order to find appropriate rotation angles for the instrument, for aiming the instrument towards the desired object point OP, it is necessary to know the distance to the target. This is why the function PixToAngle takes as an input also the target distance. It should be understood that FIG. 2 is only a schematic illustration, and that the relative distance between the instrument center and the camera has for reasons of clarity been exaggerated compared to the target distance.

Hence, it will be required to know the distance to the target if rotation angles for aiming the instrument are to be determined from the image captured by the camera sensor 10. However, a coarse difference angle $\alpha_c$ between the current line of sight of the instrument EDM beam and the selected object point can be determined from the captured image. By determining the number of pixels between the camera chip center and the identified object point in the image, the coarse difference angle $\alpha_c$ can be calculated based on any initial value for the target distance. In order to find this coarse difference angle, the target distance may in the PixToAngle function be set to infinity, or possibly to the last determined distance, if available, or to any other initial distance assumption.

When a new target has been selected by clicking or otherwise indicating it in the captured image, coarse rotation angles $\alpha_c$ for turning the instrument line of sight towards the selected target are determined from the camera pixels according to the above. The instrument is then coarsely rotated towards the selected target, and the actual line of sight for the instrument distance measurement will be towards an intermediate point. This intermediate point will be close to the intended, selected target, but it will typically not coincide exactly therewith.

Once the line of sight has been coarsely aimed at the selected target, i.e. once the instrument has been aimed at said intermediate point, the distance measuring capability of the instrument is used for determining the distance to said intermediate point. Fine rotation angles $\alpha_f^{x,y}$ are now determined from the camera pixels between the original line of sight and the selected target, now using the measured coarse (but fairly correct) distance as input to the PixToAngle function. Final aiming of the instrument may now be effected by again rotating the instrument, now based on the fine rotation angles. Once the instrument has been accurately aimed at the selected target, precision distance and angle measurement can take place.

Figure 4:
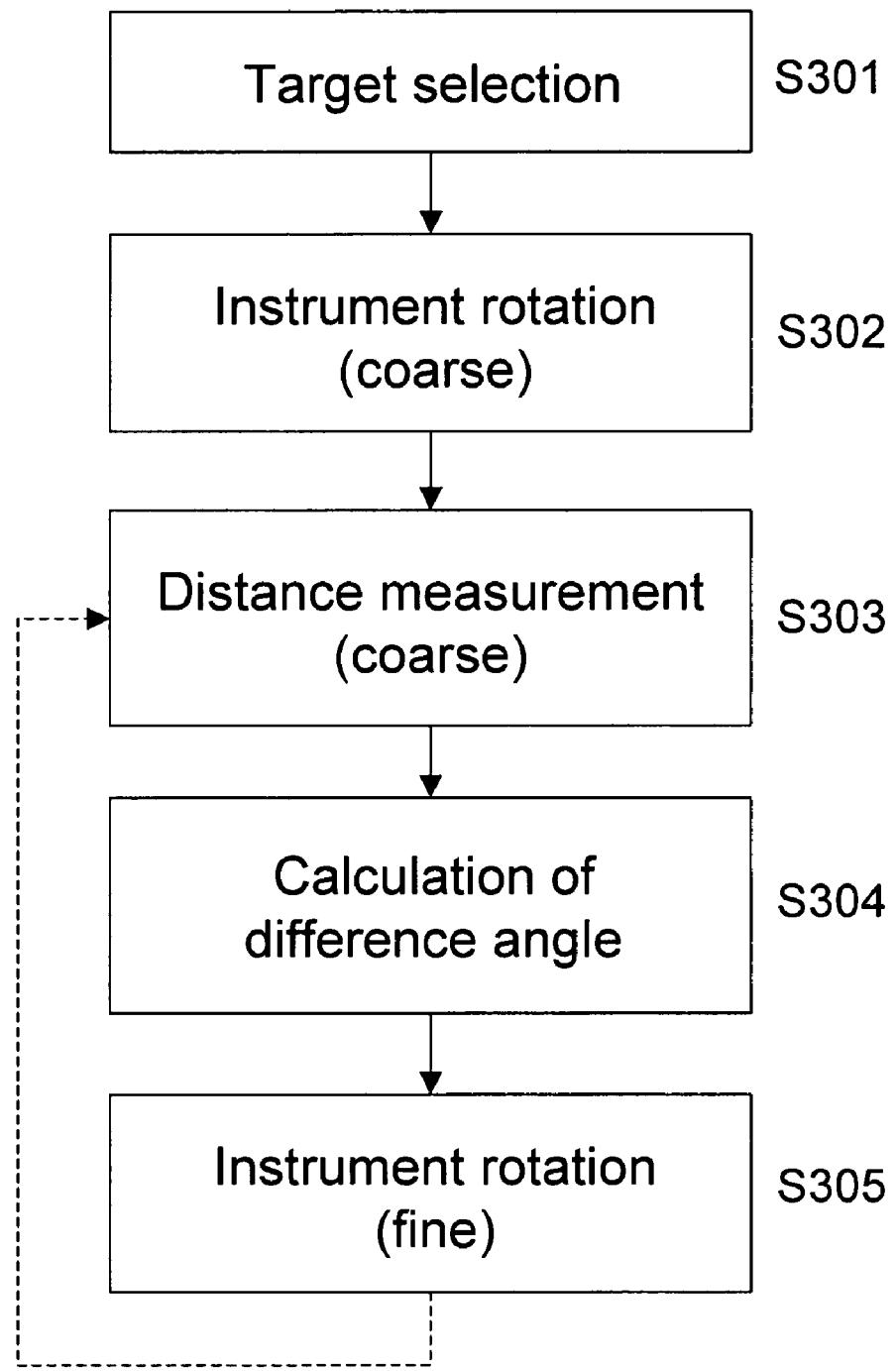
FIG. 4 is a general outline of the inventive method.

The general steps of the method according to the present invention are outlined in FIG. 4. The method starts with a target selection S301. The target, or object point, is selected or identified in the image or video feed captured by the camera. For example, the target may be selected by an operator clicking on a screen showing the image captured by the camera, or in any other suitable way of indicating the selected target with respect to the captured image. It is also envisaged that the target selection can be made in other ways, such as using prisms located at the target, edge detection, identification of target features (e.g. arrows), etc. In order to facilitate the target selection, it is preferred that it is indicated in the screen image the point at which the instrument line of sight is currently aimed, for example using a cross-hair, a dot or similar.

Once the target has been selected in step S301, coarse difference angles are calculated based on the pixel difference between the image center and the selected target, using the PixToAngle function. However, at this time, there is no reliable information about the approximate distance to the object point. This means that the calculated rotation angles are not exactly correct for aiming the instrument towards the selected target. A coarse instrument rotation is therefore effected in step S302 using the calculated coarse angles.

When the instrument has been coarsely aimed at the selected object point in step S302, the distance measurement capabilities of the instrument are used for making a coarse distance measurement to the target in step S303. Even though the instrument is not exactly aimed at the selected object point, the coarse distance measurement will typically provide a reasonable value for the distance to the selected object point.

In step S304, fine difference angles are calculated by means of the pixel difference between the image center and the selected target, again using the PixToAngle function, but now with the measured coarse distance as input. Using the fine difference angles calculated based on the coarse distance measured in step S303, a fine instrument rotation is performed in step S305. Since the coarse distance obtained in step S303 is close to the true distance to the target, the instrument will typically be accurately aimed at the selected target after the fine instrument rotation in step S305. However, if desired, it is possible to repeat the method from step S303, as indicated by the dashed arrow in FIG. 4, in order to further improve the accuracy of the instrument aiming. It is also possible to select a new target, thus repeating the method from step S301, or to make a more accurate target selection (e.g. from a zoomed image) and then repeat the method from step S301.

Figure 5:
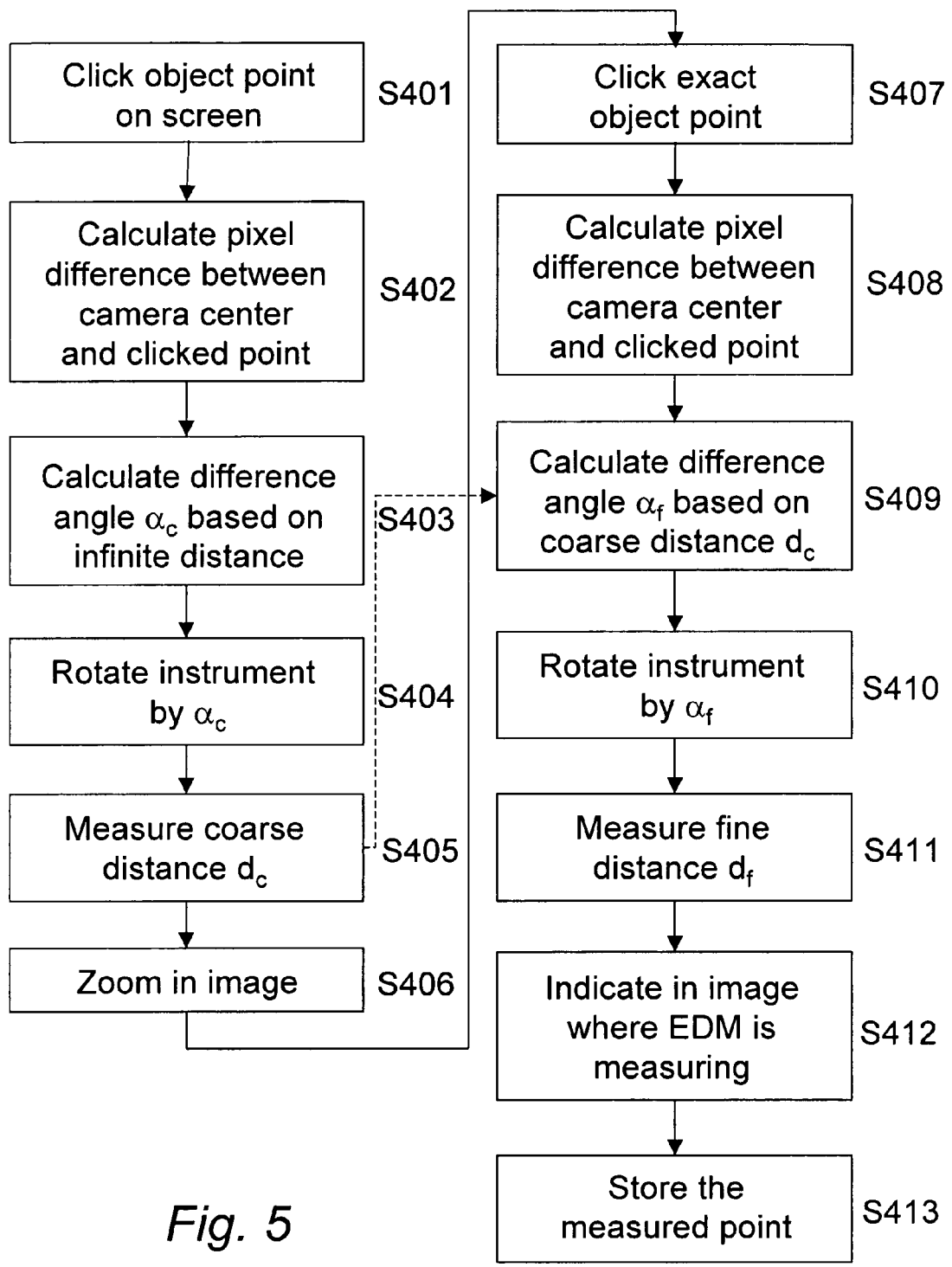
FIGS. 5-7 are more detailed outlines of various implementations of the inventive method.

In embodiments of the invention, any display used for showing to an operator the image or video feed captured by the camera may have limited resolution. For this reason, it may be desired to make provisions for zooming in the image and to let the operator indicate the selected object point in the zoomed image. To this end, an alternative method as illustrated in FIG. 5 is provided. Zooming may be effected in any conventional manner, such as using digital zooming, an adjustable lens system, an alternative lens system, or an alternative camera device.

The method illustrated in FIG. 5 starts in step S401 by the operator clicking a desired object point in the image shown on a screen. As mentioned above, the object point may alternatively be identified in other ways, such as by image processing. Then, in step S402, the pixel difference between the center of the camera image and the clicked point is calculated. Based on the calculated pixel difference, coarse difference angles $\alpha_c$ are calculated in step S403 using the PixToAngle function assuming an infinite distance to the object point. In step S404, the instrument is rotated over the calculated coarse difference angles, in order to aim the instrument roughly at the indicated object point. However, when the camera is eccentric with respect to the line of sight of the instrument (the EDM beam), rotation under the coarse difference angles will not aim the instrument exactly at the desired target as indicated by the object point, since the center of rotation for the instrument is different from the center of the camera system, and since the angles were calculated using an incorrect (assumed) value for the distance. In step S405, a coarse distance $d_c$ to the target is measured. The distance measured in step S405 will be measured to an intermediate point which is close to, but typically not coinciding with, the desired target. However, the coarse distance measured in step S405 is typically a good estimate of the true distance to the target. In step S406, the image displayed to the operator is zoomed in and in step S407 the operator clicks the exact desired object point in the zoomed image. By zooming in the image in step S406, the operator is allowed to more accurately indicate the desired object point in the image than would be convenient in the original image. It should be noted that it may be desired to have a large field of view for the first selection of object point in step S401, while the exact identification of the desired object point in step S407 could be made in an image where the original image center is not even visible due to the zooming. Once the exact object point has been indicated by the operator in step S407, pixel difference is between image center and the indicated object point is again calculated, in step S408. In order to aim the instrument exactly at the desired target, a fine adjustment of the instrument will now typically be required. Based on the new pixel difference calculated in step S408, fine difference angles $\alpha_f$ are calculated in step S409 and the coarse distance $d_c$ measured in step S405 is used for the calculation. In step S410, a final rotation is effected to aim the instrument at the desired target. Once the instrument has been correctly aimed at the desired target in step S410, an accurate measurement of the distance $d_f$ (and the angles) to the target is performed in step S411. The operator may, as indicated in step S412, be informed about the exact point where the measurement is made by an indication in the displayed image. Once the angles to the desired target and the distance have been determined with respect to the instrument coordinate system, the measured point is typically stored into a memory, as indicated in step S413.

Although the steps S401-S413 are shown in sequential order in FIG. 4, it should be understood that some of the steps may be performed in another order, or even simultaneously. For example, the operation of the EDM system is independent of the camera system. This means, for example, that the coarse measurement of step S405 may be performed before, during or after the image is zoomed (step S406). Likewise, the fine distance measurement in step S411 and the indication of the EDM measurement point in step S412 could take place in any order, or even simultaneously.

It should also be noted that the method illustrated in FIG. 5 could also be performed without the zooming and target selection of steps S406 to S408. Instead, and as indicated by the dashed connection between steps S405 and S409, the difference angles could be calculated directly based on the original target selection made in step S401.

Figure 6:
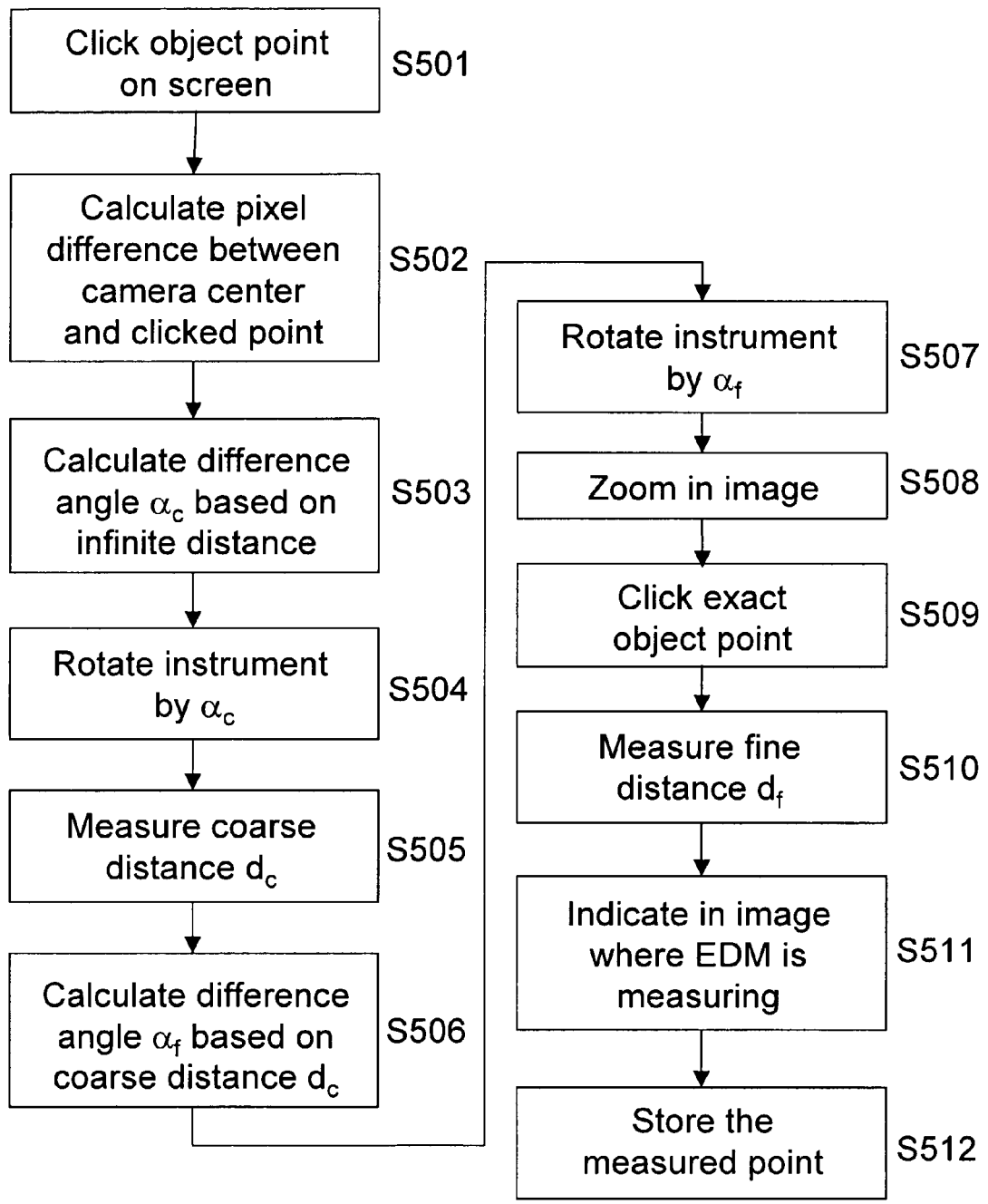

An alternative method is illustrated in FIG. 6. The method illustrated in FIG. 6 starts in step S501 by the operator clicking a desired object point in the image shown on a screen. Then, in step S502, the pixel difference between the center of the camera image and the clicked point is calculated. Based on the calculated pixel difference, coarse difference angles $\alpha_c$ are calculated in step S503 using the PixToAngle function assuming an infinite distance to the object point. In step S504, the instrument is rotated over the calculated coarse difference angles, in order to aim the instrument roughly at the indicated object point. However, when the camera is eccentric with respect to the line of sight of the instrument, rotation under the coarse difference angles will not aim the instrument exactly at the desired target as indicated by the object point, since the center of rotation for the instrument is different from the center of the camera system. In step S505, a coarse distance $d_c$ to the target is measured. The distance measured in step S505 will be measured to an intermediate point which is close to, but typically not coinciding with, the desired target. However, the coarse distance measured in step S505 is typically a good estimate of the true distance to the target. In step S506, fine difference angles $\alpha_f$ are calculated based upon the pixel difference calculated in step S502, but this time using the coarse distance measured in step S505. In step S507, a fine rotation of the instrument by $\alpha_f$ is made in order to have the instrument aimed exactly at the desired target. Once the instrument has been aimed at the desired target in step S507, the image shown to the operator is zoomed in (step S508), and the operator may confirm the exact object point in step S509 by clicking in the image. If desired, a further fine rotation of the instrument may take place (similar to steps S408-S410 shown in FIG. 4) after the operator has confirmed the exact object point in step S509. This procedure may be preferred when the operator uses an original, zoomed-out image to indicate a general area of interest (for example a building within the field of view), and then uses the zoomed-in image to designate an exact object point for measurement (for example a gable of the building). In some instances, it suffices that the operator confirms the exact object point in step S509, and in other instances there is a need for a further fine rotation of the instrument in order to aim exactly at the desired target. Once the exact object point has been confirmed or indicated in step S509 (and optionally after a further fine rotation of the instrument), a fine distance measurement is performed in step S510 to find the distance $d_f$ to the target. As will be understood, the measured distance is also associated with the corresponding horizontal and vertical rotational angles of the instrument, i.e.

measurement data (angles and distance) for a point are obtained. The target measured by the EDM may optionally be indicated in the image in step S511 to provide another confirmation to the operator. When the distance $d_f$ to the target has been determined, the coordinates of the measured point are stored into a memory in step S512.

Figure 7:
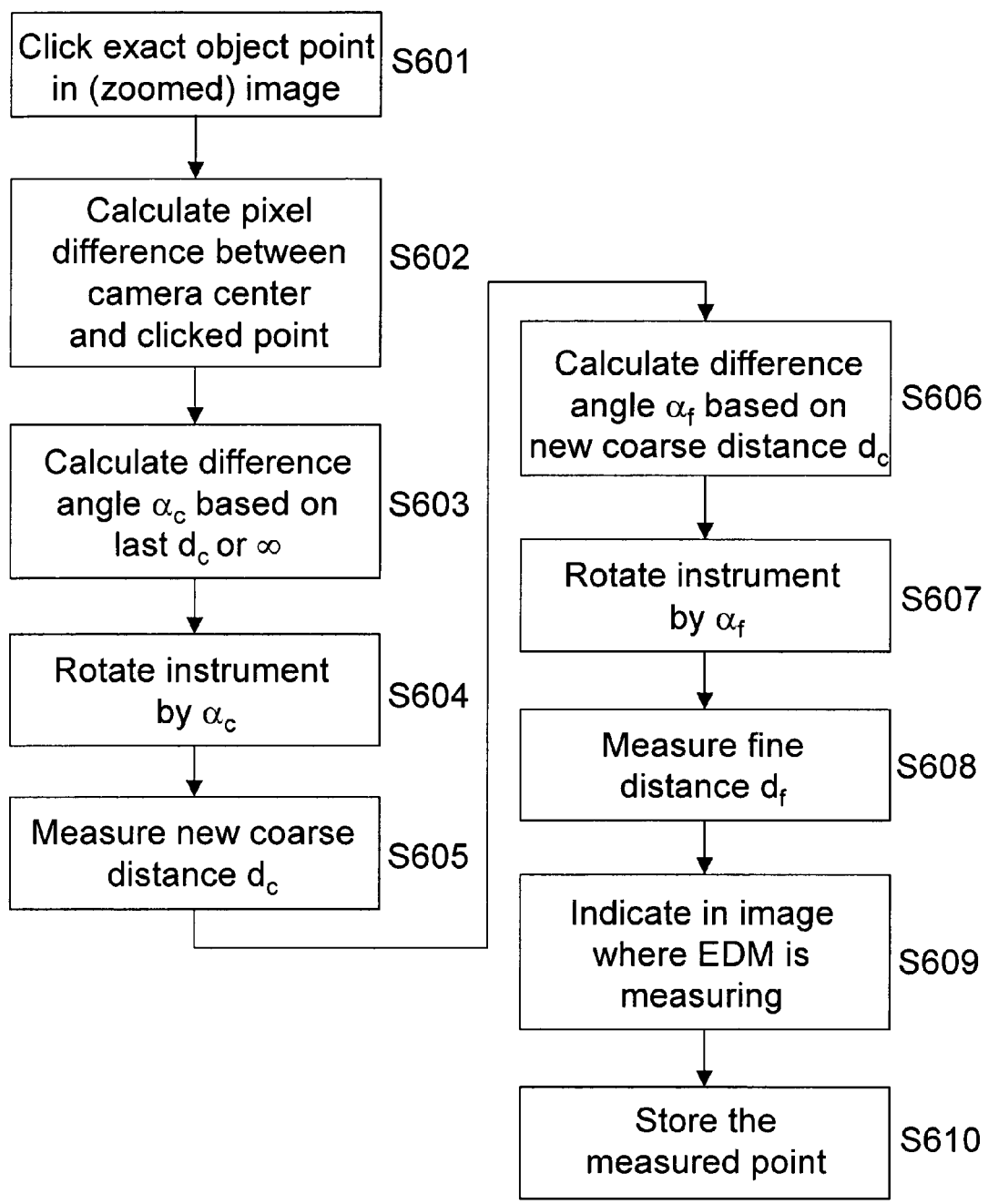

FIG. 7 illustrates a method performed when the desired object point is already within the field of view of the zoomed-in image displayed to the operator. Since the exact object point is already shown in the zoomed-in image, the operator may at once indicate the desired target by clicking the exact object point in step S601. Once the exact object point has been clicked, pixel difference between the camera center and the clicked point is calculated in step S602. Using the calculated pixel difference, difference angles are calculated. Since the image is already zoomed in, a previous coarse measurement of the distance $d_c$ to the target has typically already been performed. Therefore, the coarse rotation angles used for the rotation of the instrument in step S604 are calculated assuming a distance to the target equal to the previous coarse distance $d_c$ measured (rather than infinity as for the case above). However, if no previous value for the distance is available, infinity can be assumed as before. The coarse rotation performed in step S604 will thus typically aim the instrument nearly at the desired target. Once the coarse rotation has been performed in step S604, a new coarse distance $d_c$ is measured in step S605. Fine difference angles $\alpha_f$ are now calculated in step S606 using the pixel difference between the image center and the clicked exact object point, and using the new coarse distance $d_c$ measured in step S605. The instrument is then aimed exactly at the desired target in step S607 by rotation over the calculated angles. Once the instrument has been correctly aimed at the target, the exact distance $d_f$ to the target is measured in step S608, and the measured point (angles and distance) is stored into a memory in step S610. It may also in this case be preferred to indicate, by means of a virtual cross-hair or similar, in the displayed image the spot where the EDM is measuring (step S609).

For a surveying instrument in which the camera center and the instrument center are eccentric, as described in detail above, the center of the image captured by the camera does not typically coincide with the point which is measured by the EDM capabilities of the instrument. In order to correctly draw an indication, such as a virtual cross-hair, in the displayed camera image at the correct measurement position, the target distance should again be taken into account. As will be understood, for a hypothetical target distance equal to infinity, the eccentricity of the camera can be ignored, and the virtual cross-hair can be drawn at the principal point of the camera (typically at the center of the camera image). However, as the target distance decreases, the correct position of the virtual cross-hair moves further and further away from the principal point due to the camera eccentricity.

In order to draw the virtual cross-hair at the appropriate point in the camera image, there is also implemented a function which is an inverse of the above-mentioned PixToAngle function, called AngleToPix. Using this function, the cross-hair is drawn at the appropriate position in the displayed camera image. As will be understood, the appropriate position for the cross-hair will generally not correspond to the center of the image.

In a situation where the camera image has been "zoomed in", it is also possible to crop the displayed image such that the cross-hair is shown at the image center. As will be understood, when the image is zoomed in, the effects of the eccentric camera position get exaggerated such that the cross-hair position is located further from the center of the image. From a user convenience perspective, it may then be preferred to crop the image such that the cross-hair is positioned closer to the image center.

Figure 8:
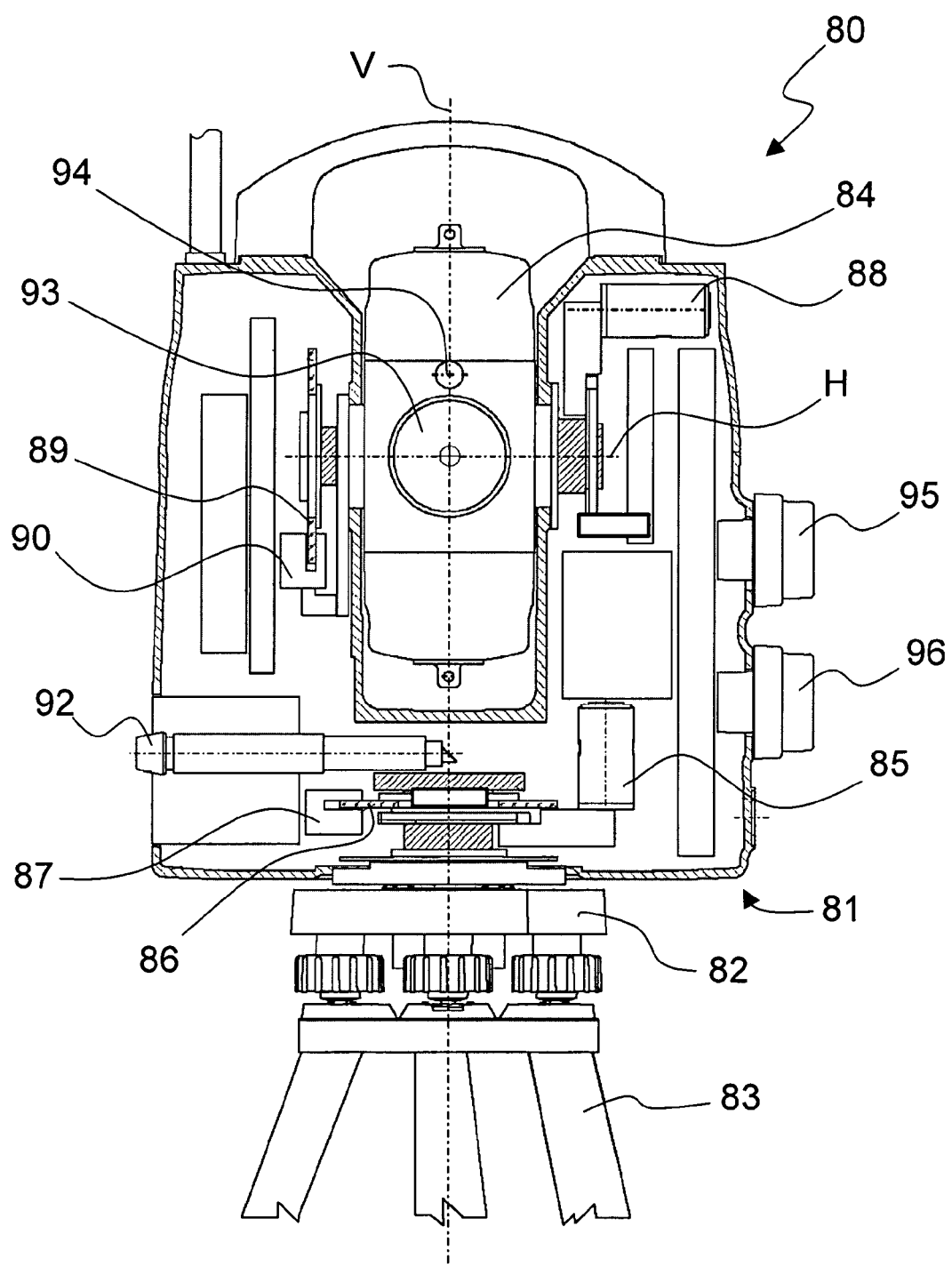
FIG. 8 shows schematically a geodetic instrument according to the present invention.

In FIG. 8, there is shown one example of a total station according to the present invention. In many aspects, the total station comprises features known from previous instruments. For example, the total station 80 shown in FIG. 8 comprises an alidade 81 mounted on a base 82, and has a mounting support structure in the form of a tripod 83. The alidade 81 can be rotated about a vertically oriented rotation axis V, in order to aim the instrument in any desired horizontal direction. In the alidade, there is arranged a center unit 84, which can be rotated about a horizontally oriented rotation axis H, in order to aim the instrument in any desired vertical direction. Measurements made using the total station 80 are typically related to an origin of coordinates located at the intersection between the vertically oriented and the horizontally oriented rotation axes V and H.

For rotation of the alidade about the vertically oriented rotation axis to aim the instrument in any desired horizontal direction, there is provided drive means 85. The rotational position of the alidade 81 is tracked by means of a graduated disc 86 and a corresponding angle encoder or sensor 87. For rotation of the center unit 84 about the horizontally oriented rotation axis, there are provided similar drive means 88, graduated disc 89 and sensor 90. Moreover, the instrument has an optical plummet 92, which gives a downwards view along the vertically oriented rotation axis. The optical plummet is used by the operator to center or position the instrument above any desired point on the ground.

As mentioned above, the instrument line of sight is centered at the intersection between the vertical and the horizontal rotation axes, and this can be seen in the figure where these axes cross in the center of a telescope 93 in the center unit 84.

Above the telescope, in the center unit, there is provided a camera 94 for capturing an image or a video feed generally in the direction of the instrument line of sight. However, as shown, the camera 94 is eccentric from the center of the telescope 93; in this case, the camera is mounted vertically above the telescope. The instrument also comprises a display device for showing the image captured by the camera. The display may be an integral part of the instrument, but more preferably, the display is included in a removable control panel that can be used for remote control of the instrument via short range radio. It is even conceivable that the instrument is fully remote controlled, wherein the display may be in the form of a computer screen far away, and wherein information to and from the instrument are transferred over a wireless computer or radio telephone network.

The instrument can also be manually operated for aiming towards a desired target using vertical and horizontal motion servo knobs 95 and 96.

According to the present invention, the instrument further comprises means for identifying an object point corresponding to a selected target in the displayed image; means for calculating first horizontal and vertical rotation angles based on the object point identified in said image; means for rotating the surveying instrument over said first horizontal and vertical rotation angles to an intermediate line of sight; means for measuring a distance along said intermediate line of sight; and means for calculating second horizontal and vertical rotation angles based on the object point in said image and on a distance measured by the means for measuring a distance.

The means for identifying the object point in the captured image may take the form of a cursor that can be moved across the display. Alternatively, the display may be a touch display, where the object point is identified by simply clicking or tapping on the display.

It is also conceivable that the means for identifying the object point is implemented in the form of image processing software. In such case, object points may be identified based on certain features in the captured image, for example markers or patterns located at the desired target. In case the object point is automatically identified by the instrument, it is preferred that the user is given the option to give a confirmation that the identified object point is correct before or during the aiming and measuring procedures.

The means for calculating rotation angles are preferably implemented in the form of computer program code that is executed in a processor. However, implementation may also be made in dedicated hardware, such as in a special purpose microprocessor or a digital signal processor (DSP), firmware or similar.

The means for rotating the instrument is preferably implemented in association with the servo control system for the instrument for controlled activation of the drive motors 85 and 88 (see FIG. 8).

While specific embodiments have been described, the skilled person will understand that various modifications and alterations are conceivable within the scope as defined in the appended claims.

The invention claimed is:

1. A method for aiming a surveying instrument towards a selected target, comprising:
   capturing an image using a camera in the surveying instrument;
   selecting a target by identifying an object point in the image captured by the surveying instrument;
   calculating first horizontal and vertical rotation angles based on the object point identified in said image;
   rotating the surveying instrument over said first horizontal and vertical rotation angles to an intermediate line of sight;
   measuring a distance to a point along said intermediate line of sight; and
   calculating second horizontal and vertical rotation angles based on the object point in said image and on said measured distance.

2. The method of claim 1, further comprising rotating the surveying instrument over said second horizontal and vertical rotation angles to a line of sight towards the selected target.

3. The method of claim 2, wherein the first horizontal and vertical rotation angles are calculated based on an assumed target distance.

4. The method of claim 3, wherein the first horizontal and vertical rotation angles are calculated based on an assumed target distance equal to infinity.

5. The method of claim 3, wherein the first horizontal and vertical rotation angles are calculated based on an assumed target distance equal to a previously measured target distance.

6. A non-transitory computer readable medium including computer program code portions, adapted to perform the method of claim 2 when loaded and executed in a computer.

7. The method of claim 1, wherein the first horizontal and vertical rotation angles are calculated based on an assumed target distance.

8. The method of claim 7, wherein the first horizontal and vertical rotation angles are calculated based on an assumed target distance equal to infinity.

9. The method of claim 7, wherein the first horizontal and vertical rotation angles are calculated based on an assumed target distance equal to a previously measured target distance.

10. The method of claim 1, further comprising:
    zooming in the image; and
    confirming the selected target in the zoomed image, wherein the step of calculating the second horizontal and vertical rotation angles is performed based on the confirmed target.

11. The method of claim 1, wherein the measuring of the distance to a point along said intermediate line of sight is performed using distance measuring capabilities within the surveying instrument.

12. The method of claim 1, further comprising indicating in the displayed image a point corresponding to a current line of sight for the surveying instrument.

13. The method of claim 12, further comprising cropping the displayed image such that the point corresponding to the current line of sight for the surveying instrument is indicated approximately at the center of the displayed image.

14. A computer readable medium including computer program code portions, adapted to perform the method of claim 1 when loaded and executed in a computer.

15. A surveying instrument, comprising:
    a camera;
    means for displaying an image captured by the camera;
    means for identifying an object point corresponding to a selected target in the displayed image;
    means for calculating first horizontal and vertical rotation angles based on the object point identified in said image;
    means for rotating the surveying instrument over said first horizontal and vertical rotation angles to an intermediate line of sight;
    means for measuring a distance along said intermediate line of sight; and
    means for calculating second horizontal and vertical rotation angles based on the object point in said image and on a distance measured by the means for measuring a distance.

16. The instrument of claim 15, further comprising means for zooming the image captured by the camera.

17. The instrument of claim 16, wherein the means for zooming includes at least one of a digital zoom, an adjustable lens system, an alternative lens system, and an alternative camera device.

18. The instrument of claim 15, wherein the means for identifying an object point is implemented as a cursor movable across the displayed image.

19. The instrument of claim 15, wherein the means for identifying an object point is implemented using a touch display, wherein the object point is identifiable by clicking or tapping on the display.

20. The instrument of claim 15, wherein the means for identifying an object point is implemented using image processing software.

* * * * *

UNITED STATES PATENT AND TRADEMARK OFFICE
Certificate

Patent No. 7,930,835 B2                                                   Patented: April 26, 2011

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Set Svanholm, Sollentuna (SE); Christian Grässer, Vallentuna (SE); Michael Vogel, Schleifreisen (DE); Nick Mein, NZ-Christchurch (NZ); and Torsten Kludas, Zottelstedt (DE).

Signed and Sealed this Tenth Day of September 2013.

PETER MACCHIAROLO
*Supervisory Patent Examiner*
Art Unit 2856
Technology Center 2800